US007803089B2

(12) United States Patent
Roimicher et al.

(10) Patent No.: US 7,803,089 B2
(45) Date of Patent: Sep. 28, 2010

(54) FLEXIBLE PEDAL

(75) Inventors: Marcos D. Roimicher, Lombard, IL (US); Joseph Immordino, Hoffman Estates, IL (US); Eric White, Elgin, IL (US); Thomas J. Danowski, Schaumburg, IL (US); Rachel L. Holik, Lisle, IL (US); Juliette Daly, Chicago, IL (US); Cory H. Lazar, Homer Glen, IL (US); John C. Olson, Chicago, IL (US)

(73) Assignee: Brunswick Corporation, Lake Forest, IL (US)

( * ) Notice: Subject to any disclaimer, the term of this patent is extended or adjusted under 35 U.S.C. 154(b) by 85 days.

(21) Appl. No.: 11/709,759

(22) Filed: Feb. 23, 2007

(65) Prior Publication Data
US 2008/0207416 A1 Aug. 28, 2008

(51) Int. Cl.
*A63B 22/00* (2006.01)
*A63B 22/04* (2006.01)

(52) U.S. Cl. .............................. 482/51; 482/52; 482/79; 74/594.4

(58) Field of Classification Search .................. 482/57, 482/62, 67, 79, 80, 148, 51, 52, 53; 74/560, 74/594.3, 594.4, 594.7
See application file for complete search history.

(56) References Cited

U.S. PATENT DOCUMENTS

| 1,587,749 | A | * | 6/1926 | Bierly | 482/80 |
| 3,442,522 | A | * | 5/1969 | Spilhaus | 280/841 |
| 3,942,791 | A | * | 3/1976 | Dawson et al. | 242/140 |
| 4,111,416 | A | * | 9/1978 | Jinotti | 482/80 |
| 4,146,222 | A | * | 3/1979 | Hribar | 482/51 |
| 4,279,415 | A | * | 7/1981 | Katz | 482/80 |
| RE30,758 | E | * | 10/1981 | Lang | 474/80 |
| 4,502,680 | A | * | 3/1985 | Blum et al. | 482/8 |
| 4,639,710 | A | * | 1/1987 | McMillan et al. | 338/108 |
| 5,069,445 | A | * | 12/1991 | Mai | 482/80 |
| 5,116,295 | A | * | 5/1992 | Dunn et al. | 482/53 |
| 5,186,700 | A | * | 2/1993 | Wang | 482/111 |
| 5,256,118 | A | * | 10/1993 | Chen | 482/53 |
| 5,297,541 | A | * | 3/1994 | Hensey | 601/40 |
| 5,336,144 | A | * | 8/1994 | Rodden | 482/54 |
| 5,413,543 | A | * | 5/1995 | Drago | 482/49 |
| 5,449,332 | A | * | 9/1995 | Hervig | 482/57 |
| 5,454,772 | A | * | 10/1995 | Rodden | 482/54 |
| 5,535,642 | A | * | 7/1996 | Moll | 74/561 |
| 5,624,356 | A | * | 4/1997 | Roberts | 482/57 |

(Continued)

FOREIGN PATENT DOCUMENTS

DE 19514492 10/1996

(Continued)

*Primary Examiner*—Loan Thanh
*Assistant Examiner*—Daniel F Roland
(74) *Attorney, Agent, or Firm*—Michael B. McMurry

(57) ABSTRACT

Described is an exercise apparatus that includes reciprocating foot pedal structures where the pedal structures include various mechanisms for absorbing foot impact or forces on the foot. The pedal structures can also include a mechanism for generating a biasing force generally normal to the upper surface of the foot pedal effective to restore the pedal to its normal position after foot impact. The impact absorbing mechanisms can include resilient members, fluid filled bladders and hinge arrangements.

9 Claims, 4 Drawing Sheets

U.S. PATENT DOCUMENTS

| | | | | |
|---|---|---|---|---|
| 5,645,516 | A * | 7/1997 | Foster | 482/79 |
| D383,813 | S * | 9/1997 | Zoller | D21/685 |
| 5,665,039 | A * | 9/1997 | Wasserman et al. | 482/111 |
| 5,692,995 | A | 12/1997 | Alvarez et al. | 482/71 |
| 5,901,617 | A * | 5/1999 | Hervig | 74/594.4 |
| 5,906,565 | A * | 5/1999 | Wasserman et al. | 482/112 |
| 5,928,113 | A * | 7/1999 | Roberts | 482/57 |
| 6,003,408 | A * | 12/1999 | Hervig | 74/594.4 |
| 6,123,650 | A * | 9/2000 | Birrell | 482/70 |
| 6,132,340 | A * | 10/2000 | Wang et al. | 482/54 |
| 6,168,551 | B1 * | 1/2001 | McGuinness | 482/51 |
| 6,238,319 | B1 * | 5/2001 | Young | 482/19 |
| 6,241,639 | B1 * | 6/2001 | Hervig | 482/57 |
| 6,260,434 | B1 * | 7/2001 | Holtorf | 74/512 |
| 6,360,630 | B2 * | 3/2002 | Holtorf | 74/512 |
| 6,413,194 | B1 * | 7/2002 | Gant | 482/112 |
| 6,500,096 | B1 | 12/2002 | Farney | 482/52 |
| 6,572,513 | B1 * | 6/2003 | Whan-Tong et al. | 482/54 |
| 6,582,344 | B2 * | 6/2003 | Tang | 482/53 |
| 6,705,975 | B2 * | 3/2004 | Kuo | 482/79 |
| 6,723,026 | B2 * | 4/2004 | Chen et al. | 482/53 |
| 6,796,928 | B1 * | 9/2004 | Christopher et al. | 482/51 |
| 6,953,418 | B1 * | 10/2005 | Chen | 482/51 |
| 7,131,934 | B2 * | 11/2006 | Dadbeh | 482/52 |
| 7,175,567 | B2 * | 2/2007 | Barbafieri et al. | 482/31 |
| 7,207,930 | B2 * | 4/2007 | Bonutti | 482/111 |
| 7,300,387 | B2 * | 11/2007 | Wang | 482/52 |
| 2001/0020401 | A1 * | 9/2001 | Holtorf | 74/560 |
| 2002/0132707 | A1 * | 9/2002 | Wang et al. | 482/52 |
| 2002/0165069 | A1 * | 11/2002 | Ravikumar et al. | 482/80 |
| 2004/0048722 | A1 * | 3/2004 | Epstein | 482/54 |
| 2004/0266588 | A1 * | 12/2004 | Miller | 482/52 |
| 2005/0227817 | A1 * | 10/2005 | Anderson et al. | 482/52 |
| 2005/0277518 | A1 * | 12/2005 | Fan | 482/52 |
| 2006/0172862 | A1 | 8/2006 | Badarneh et al. | 482/52 |
| 2006/0199703 | A1 * | 9/2006 | Shifferaw | 482/52 |
| 2007/0135267 | A1 * | 6/2007 | Wang | 482/52 |
| 2007/0135268 | A1 * | 6/2007 | Wang | 482/52 |
| 2007/0135269 | A1 * | 6/2007 | Wang | 482/52 |
| 2007/0191196 | A1 * | 8/2007 | Bonutti | 482/112 |
| 2008/0161166 | A1 * | 7/2008 | Lo | 482/52 |
| 2008/0248934 | A1 * | 10/2008 | Gianandrea | 482/129 |

FOREIGN PATENT DOCUMENTS

WO     WO 0107280     10/2001

* cited by examiner

FLEXIBLE PEDAL

FIELD

The present disclosure relates to exercise equipment, and more particularly to foot pedals for exercise equipment.

BACKGROUND

The statements in this section merely provide background information related to the present disclosure and may not constitute prior art.

During operation of exercise equipment having foot pedals especially weight bearing machines such as stairclimbers and elliptical type stepping machines, users frequently experience a condition known as transient paresthesia. Transient paresthesia is a condition that results in a numb or aching sensation felt in the ball of a user's foot during exercise on a machine having foot pedals. During exercise with these types of machines, repeated bending and pressure occurs at the ball of the foot. This can result in inflammation of the soft tissues in the area near the ball of the foot, which can impinge the nerve bundles or nerve endings. In an effort to alleviate this condition, users often prematurely end an exercise session, periodically readjust their feet on the pedals, or operate the machine in reverse by for example pedaling or stepping in reverse.

SUMMARY

One approach to reducing the effects of transient paresthesia is to construct a pedal assembly that includes a foot receiving portion and a biasing portion. In one case, the foot receiving portion can include an upper and lower surfaces where the foot receiving portion is movable from a first position to a second position when a force is applied to the upper surface. The biasing portion can provide a biasing force preferably that is generally normal to the upper surface when the upper surface is acted upon by a force, thereafter urging the foot receiving portion to return to the first position, thereby providing a spring-like cushion for a user's foot.

Further areas of applicability will become apparent from the description provided herein. It should be understood that the description and specific examples are intended for purposes of illustration only and are not intended to limit the scope of the present disclosure.

DRAWINGS

DETAILED DESCRIPTION

Figure 1:
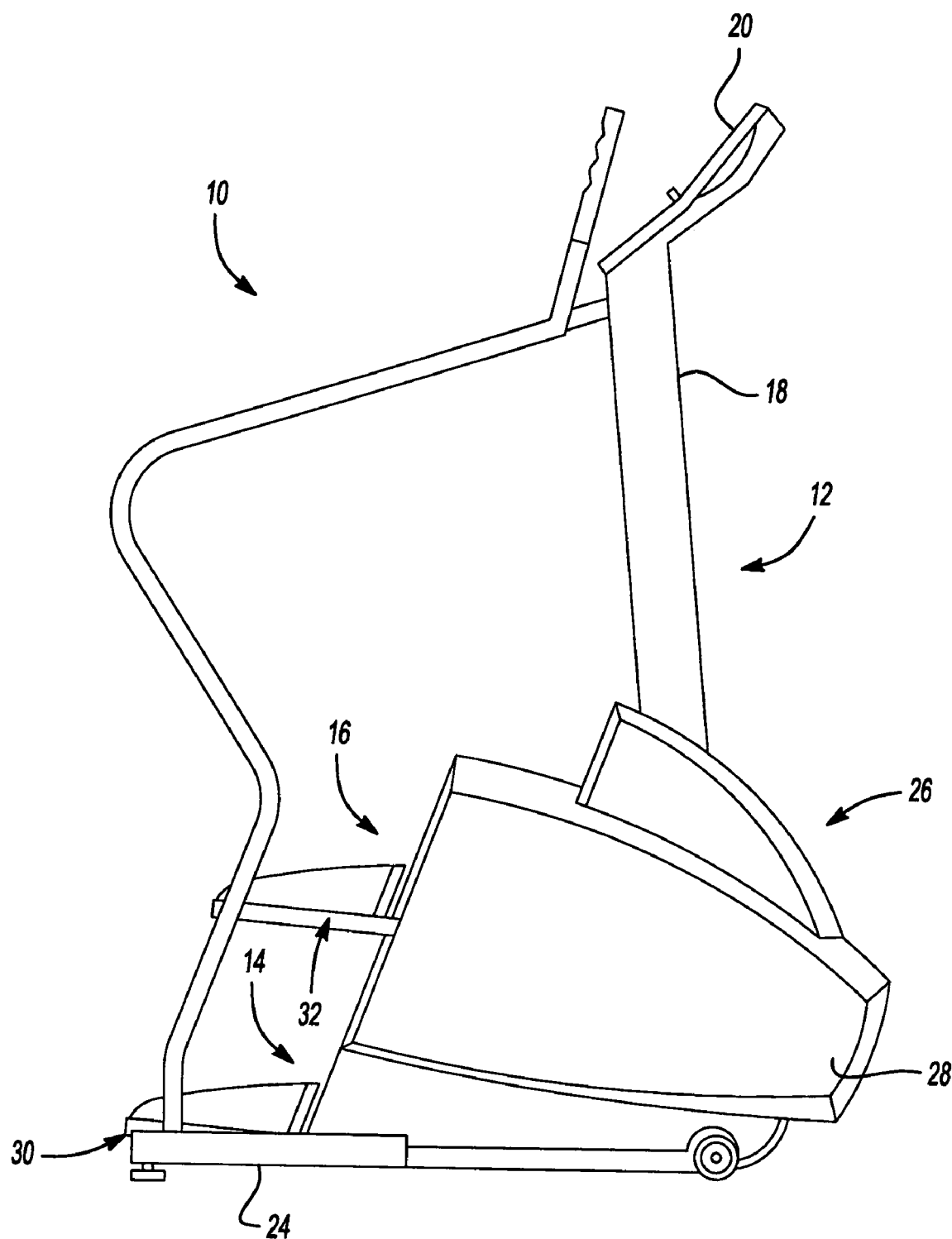
FIG. 1 is a side view of a stair climbing exercise apparatus including a foot pedal assembly according to the present teachings.

The following description provides a number of examples of foot pedal structures. In the drawings, corresponding reference numerals indicate like or corresponding parts and features.

FIG. 1 provides as representative example of an exercise machine 10 in which the below described pedal structure can be used. In this example, the exercise machine 10 is a stair-stepper exercise apparatus 10 that includes a main body portion 12 and left and right foot pedal assemblies indicated at 14 and 16. Machines of this type typically include a main body portion 12, a frame 18, a control panel 20, a pair of handrails 22, a base support member 24, and a stair actuation assembly generally indicated at 26 which is enclosed within a housing 28. Here, the frame 18 and handrails 22 are coupled to one another at first ends and are coupled to base support member 24 at second ends. The stair actuation assembly 26 includes an actuation mechanism (not shown) within the cover 28 having a pair of pedal mounting structures 30 and 32 extending there from and that, in this particular machine 10, reciprocate in a generally vertical direction. It should be noted that for the purpose of describing the various embodiments of foot pedal assemblies described herein, the term reciprocating encompasses generally repetitive foot pedal motions including the generally elliptical motions found in exercise machines such as described in U.S. Pat. No. 7,101,316. In this embodiment, the foot pedal assemblies 14, 16 are attached to the mounting structures 30 and 32. Since in most applications the left and right foot pedal assemblies 14 and 16 will be generally similar to each other, only the right foot pedal assembly 16 will be described in detail-with the understanding that the description applies to left foot pedal assembly 14.

Figure 2:
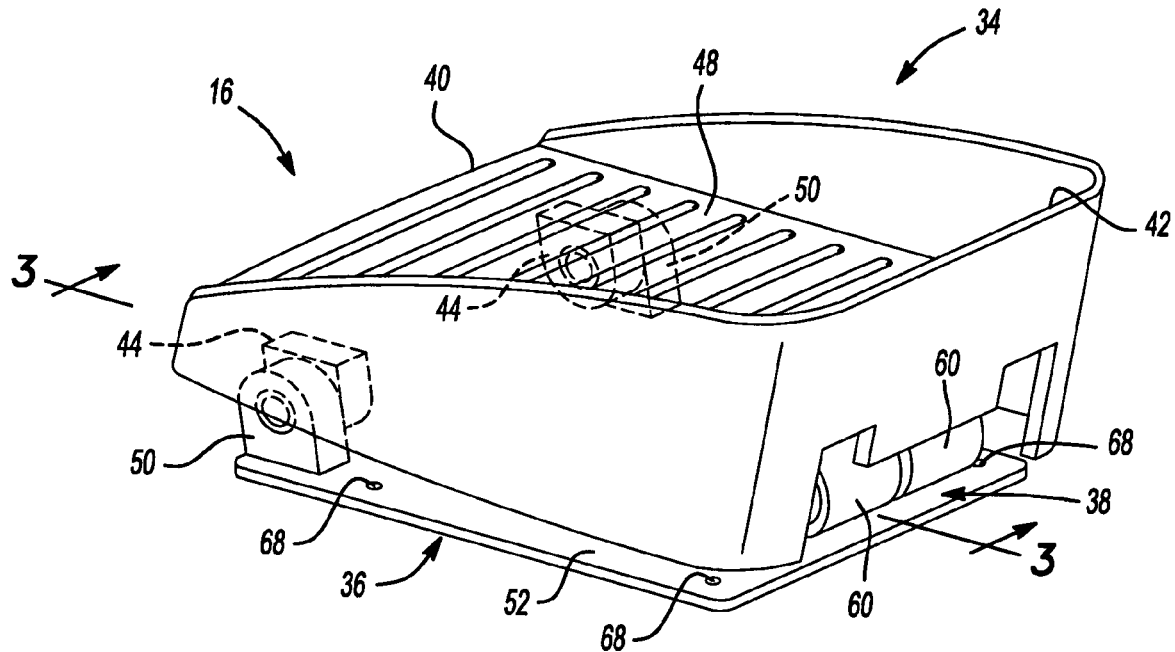
FIG. 2 is a perspective view of a first foot pedal assembly.
Figure 3:
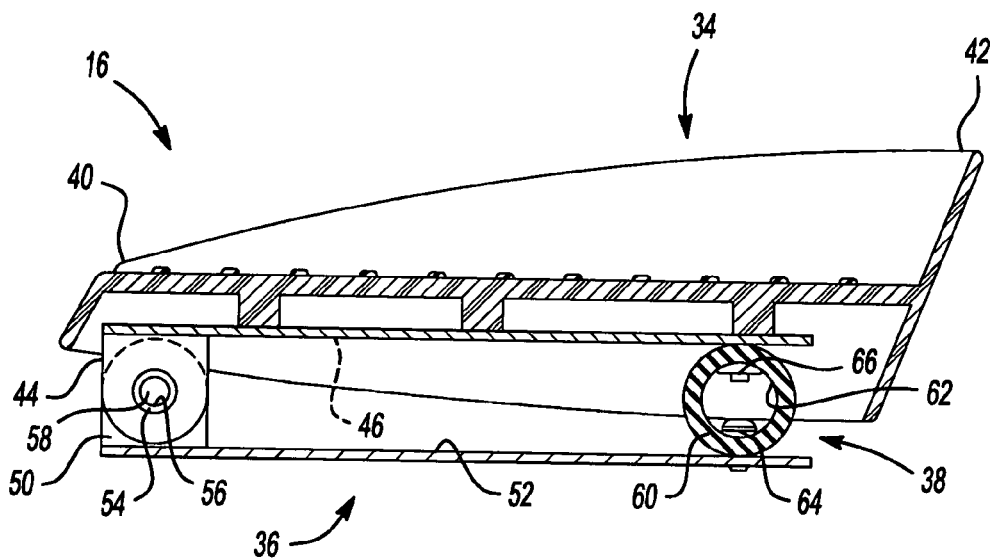
FIG. 3 is a sectional view of the foot pedal assembly of FIG. 2.

FIGS. 2 and 3 illustrate a first example of the right foot pedal assembly 16 that, in this embodiment, includes a generally rigid foot receiving portion 34, a base 36, and a resilient material 38. The foot receiving portion 34 includes a first and a second end 40 and 42. In this case, the first end 40 is configured to form a foot receiving portion 34, generally providing a location for a heel portion of a user's foot. Preferably, the base 36 is directly attached to the mounting structure 32. In this embodiment of the pedal structure 16, the first end 40 is pivotally coupled to the base 36. Any number of different arrangements can be used to perform this pivoting function but the preferred arrangement includes a first pair of pivot mounts 44 secured to a bottom surface 46 of the first end 40 of the foot receiving portion 34. In this configuration, the base 36 is a generally planer member generally similar in shape and size to an upper member 48 of foot receiving portion 34. A second pair of pivot mounts 50 extends from a base member 52 of the base 36. A pair of apertures 54 and 56, configured in arms 44 and 50 respectively, receives a pivot shaft 58 thereby effectively coupling the foot receiving portion 34 to the base 36 at the first end 40 so as to permit the second end 42 of the upper surface 48 to pivot downwardly in a direction generally perpendicular to the plane of the base member. As a result, the second end 42 of the upper member 48 will tend to deflect downwardly in a direction generally normal to lower surface 46 when a force is applied to upper member 48, such as that applied by the ball of a user's foot during operation. This can be accomplished through the use of resilient member 38.

In the preferred embodiment, the resilient material 38 is secured between the lower member 46 and the base member 52 of the base 36. The resilient material 38 can take any of a multitude of forms and made of variety of resilient materials including foam, rubber or even metal springs but preferably includes a pair of elliptically shaped, elastomeric shock absorbing elements 60 having an inner aperture 62 as shown in FIG. 2. A first fastener 64 can be used to secure the resilient members 60 to the base member 52 and a second fastener 66 can be used to secure the resilient member 60 to the lower member 46 of the foot receiving portion 34.

The lower member 52 of the base 36 can include a series of apertures 68 for receiving fasteners to attach the right foot pedal assembly 16 to mounting structure 32. This arrangement has the advantage of making it possible to install the right foot pedal assembly 16 either as a replacement on existing exercise machines or as original equipment on new machines.

In operation, as a user applies weight to upper surface 48 of foot receiving portion 34, foot receiving portion 34 rotates about the pivot shaft 58 from a first position to a second position. Resilient member 38 deflects, resulting in downward movement of foot receiving portion second end 42 in a direction generally normal to lower surface 46 to the second position. This results in a reduction of impact on a user's foot when applying a force to foot receiving portion 34. The resilient member 38 also serves to bias the foot receiving portion 34 upward to its original position or returns the foot receiving portion 34 to its original position when downward pressure is not being applied to the pedal 34.

Figure 4:
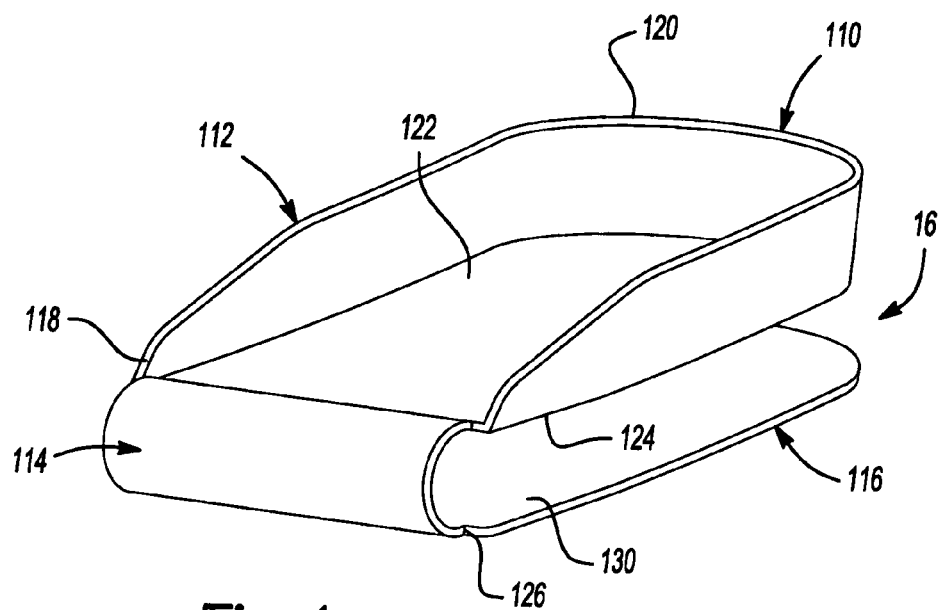
FIG. 4 is a perspective view of a second foot pedal assembly.

FIG. 4 shows a second example of a compliant or resilient pedal structure. Although it can be made out of separate elements secured together, in this embodiment, the right foot pedal assembly 16 is preferably configured out of metal in the form of a one-piece body 110. The one-piece body 110 in this case includes a foot receiving portion 112, a hinge portion 114, and a base portion 116. Here, the foot receiving portion 112 includes first and second ends 118 and 120 and generally planar upper and lower surfaces 122 and 124.

First end 118 can form a rear end of foot receiving portion 112, generally providing a location for a heel portion of a user's foot. As illustrated in FIG. 4, the hinge portion 114 extends from first end 118 of foot receiving portion 112 to a first end 126 of base portion 116. In this embodiment, the hinge portion 114 can have an arcute shape and act as a spring thus providing a biasing force that generally urges upper surface 122 of foot receiving portion 112 into a position generally parallel to base 116. As with the pedal structure of FIG. 2, the base portion 116 can be provided with apertures for fasteners provide a mounting location for attachment with mounting structure 32 so that it can be installed either as a replacement on existing exercise machines or as original equipment on new machines.

Figure 5:
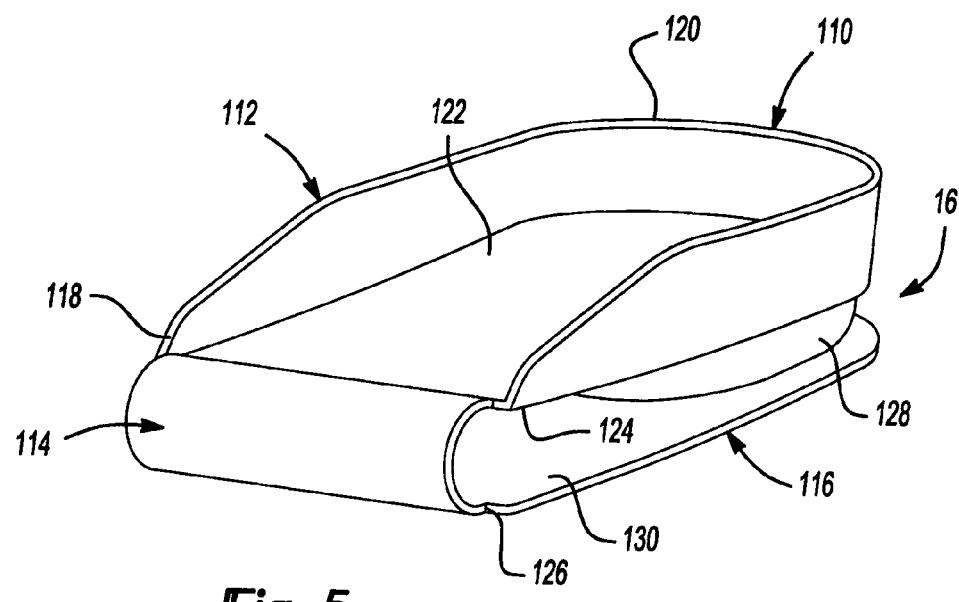
FIG. 5 is a perspective view of an alternate example of the foot pedal assembly of FIG. 4.

FIG. 5 depicts an alternate construction of the pedal structure 116. In this embodiment, a force absorption member 128 is interposed between the foot receiving portion lower surface 124 and an upper surface 130 of the base 116 near its second end 120. A variety of materials can be used for the force absorption member 128 including springs, inflatable cushions or elastomeric bumpers of the type 60 and can be secured to either or both the foot receiving portion lower surface 124 and base upper surface 130.

In the example of the pedal structure shown in FIG. 4, the initial (or first) position, foot receiving portion upper surface 122 will preferably be generally parallel to base upper surface 130. In operation, as a user applies weight to upper surface 122 of foot receiving portion 34, foot receiving portion 112 pivots about hinge 114, traveling from the initial position to a second position. As foot receiving portion 112 pivots, second end 120 is displaced toward base upper surface 130. If a sufficient force is applied, foot receiving portion 112 can ultimately contact base 116 at second end 120. When the force is released from foot receiving portion 112, the biasing force provided by the hinge portion 114 will urge the foot receiving portion 112 back to its initial position.

In the example of FIG. 5, the force absorption member 128 can act as a cushioning stop as well as providing an additional biasing force or resiliency between foot receiving portion 112 and base 116. Both of these examples can result in a reduction of impact on a user's foot when applying a force to foot receiving portion 112.

Figure 6:
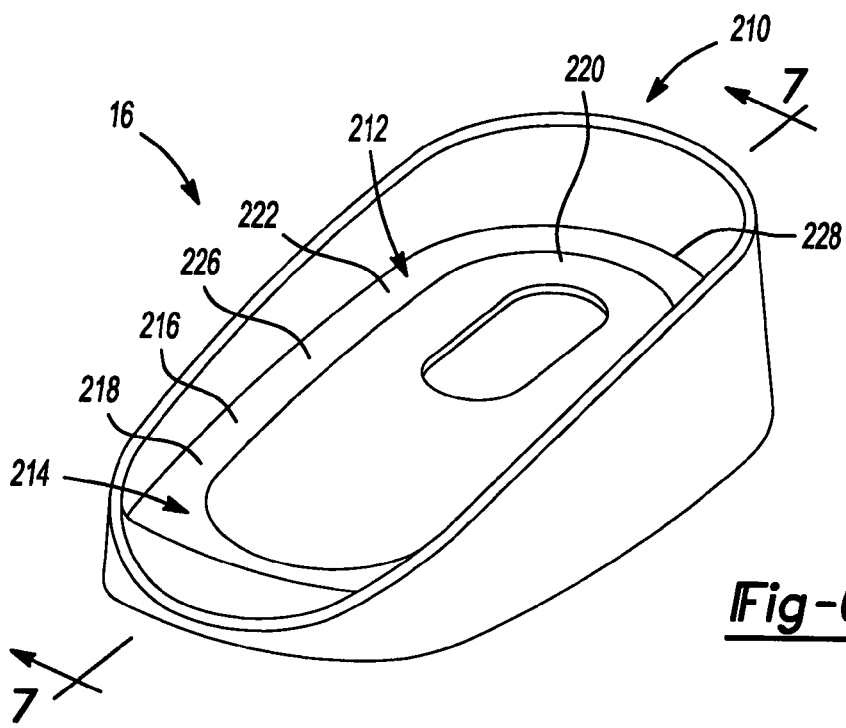
FIG. 6 is a perspective view of a third foot pedal assembly.
Figure 7:
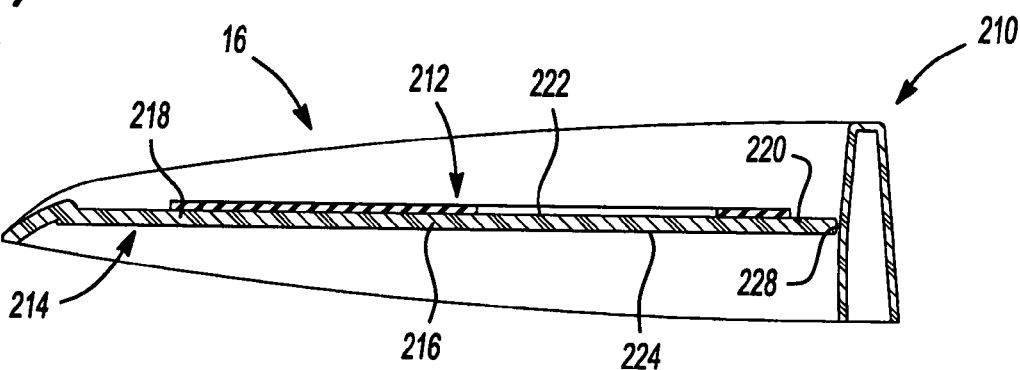
FIG. 7 is a sectional view of the foot pedal assembly of FIG. 6.

FIGS. 6 and 7 illustrate another example of a structure 212 that can form part of the pedal 16. The structure 210 includes a foot receiving portion 212 and a hinge portion 214 and can be secured to the mounting structure 32. In this embodiment, the foot receiving portion 212 includes a generally planar member 216 that includes the hinge portion 214 near a first end 218. Also, the foot receiving portion includes a second end 220 to receive the toe portion of the user's foot, an upper and a lower surfaces 222 and 224 and a perimeter support member 226. The perimeter support member 226 can also be configured with an opening 228 at the front as shown in FIG. 7. In this embodiment, the hinge portion 214 is formed generally from the first end 218 portion of the planar member 216. In this case, the hinge portion 214 acts as a spring biasing the member 216 generally upward and will flex or bend downwardly in response to the force that applied by the ball of a user's foot during operation. This will serve to reduce the of impact on the user's foot when applying a force to the pedal 16.

Figure 8:
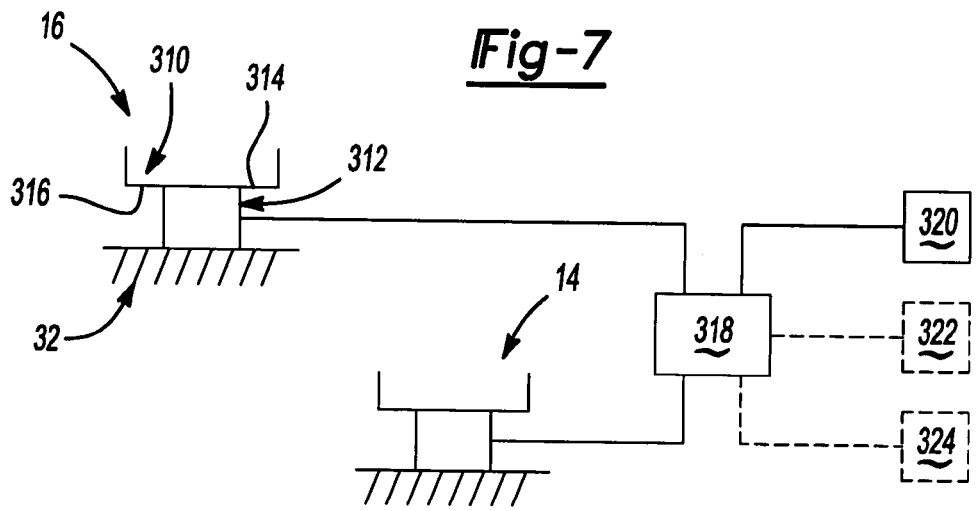
FIG. 8 is a schematic view of a fourth foot pedal assembly.

FIG. 8 shows in schematic form another embodiment of the pedal structure 16. In this example, the right foot pedal assembly 16 includes a foot pedal body 310 and a bladder or bellows 312. The foot pedal body 310 generally corresponds in form to the previously described structures and can include a generally rigid member having a foot receiving portion 314 and a lower mounting surface 316. Preferably, the bladder 312 is secured between the mounting surface 316 and the mounting structure 32.

The bladder 312 can include any appropriate sized bladder or bellows and can filled with a fluid, either gas or liquid, where the fluid can be of constant or varying density. Also, in the preferred embodiment and connected to the bladder 312 is a control valve assembly 318 that can be used to control the amount or pressure of the fluid in the bladder 312. In this embodiment, the other foot pedal assembly 16 will have a similar structure and also have its fluid controlled by the control valve assembly 318.

A variety of mechanisms can be used for the control valve assembly 318, but in the preferred embodiment it will include a spring and check valve device (not shown) which would allow fluid to enter or exit the bladder 312 as well as the corresponding bladder in foot pedal assembly 14 based upon the force applied by the user to the pedals 14 and 16 and the bleed rate settings of the valve. To provide for adjustment of the fluid flow between the pedal assemblies 14 and 16, the control valve assembly 318 can further include a control device 320 that can be used to control user input and bleed rate settings. Optionally, an additional pressure source 322 or accumulators 324 can be operatively connected to the control valve assembly 318 for transmission or storage of fluid to and from the bladder 312, thereby providing additional cushioning adjustment. Further, a fluid can be selected such that viscosity can be varied.

In operation, as a user applies weight to foot receiving portion 314, the bladder 312 will be compressed. As the bladder 312 is compressed, the fluid can be forced from resilient member 312 to any of the variety of components described above. After the user at least partially removes or reduces the weight applied to foot receiving portion 314, fluid can travel back into the bladder 312 in response to foot pressure being applied to the other pedal 14. This results in a reduction of impact on a user's foot when applying a force to foot receiving portion 314.

While the above examples describe specific fluid filled members, foam, elastomeric, or hinged biasing arrangements, it is understood that a variety of springs or other resilient members can be used as well. Further, while described in the context of stair-stepper exercise apparatus 10, the present teachings are equally applicable to a variety of other pedal operated exercise machines including elliptical and climber type machines. Additionally, while the first, second, and third examples have been described as having a resilient member near the front of the foot receiving portion and a pivotal or hinged attachment near the rear of the foot receiving portion, these can be reversed. As a result, a resilient member can be located near the rear of the foot receiving portion and a pivotal or hinged connection can be located near the front of the foot receiving portion.

We claim:

1. An exercise apparatus comprising:
  a frame;
  an actuation assembly secured to said frame;
  a mounting member operatively connected to said actuation assembly for a reciprocating motion having a substantial vertical component;
  a foot pedal assembly secured for movement with said mounting member such that said entire foot pedal assembly moves in a substantially vertical direction and has a planar reciprocation motion corresponding to said substantially vertical component and wherein said foot pedal assembly includes:
  a foot receiving portion having upper and lower surfaces along with a first heel receiving end and a second end such that a user's entire foot moves in said reciprocating motion;
  a base portion secured to the mounting member;
  a hinge portion directly connecting said base portion to said first end of said foot receiving portion wherein said second end of said foot receiving portion can move vertically with respect to said base portion;
  a biasing portion operatively attached to said second end of said foot receiving portion and said base portion effective to provide a biasing force generally normal from said base to said foot receiving portion; and
  wherein said hinge portion and said biasing portion are effective to reduce transient paresthesia on the user's foot while operating the apparatus resulting from said vertical component of said reciprocating motion.

2. The foot pedal assembly of claim 1, wherein said hinge portion has an arcuate shape effective to provide an additional biasing force generally from said base to said foot receiving portion.

3. The foot pedal assembly of claim 1 wherein said biasing portion includes a force absorption member disposed between said lower surface of said foot receiving portion and said base portion.

4. The foot pedal assembly of claim 3, wherein said force absorption member is secured to said lower surface of said foot receiving portion.

5. The foot pedal assembly of claim 4, wherein said force absorption member includes a pair of elliptically shaped elastomeric members wherein each said elastomeric member is secured to said foot receiving portion and said base portion.

6. The foot pedal assembly of claim 1, wherein said hinge portion includes a pivot assembly secured between said base portion and said foot receiving portion.

7. The foot pedal assembly of claim 6, wherein said pivot assembly includes a first pivot mount secured to said foot receiving portion, a second pivot mount secured to said base portion and a pivot shaft coupling said first pivot mount to said second pivot mount.

8. The foot pedal assembly of claim 6, wherein said biasing portion includes a force absorption member.

9. The foot pedal assembly of claim 8, wherein said force absorption member includes a resilient member interposed between said lower surface of said foot receiving portion and said base.

* * * * *